A. V. ROWE.
LINE CONTROL FOR STEERING MECHANISM OF TRACTORS.
APPLICATION FILED JUNE 23, 1919.
1,355,851.
Patented Oct. 19, 1920.
4 SHEETS—SHEET 1.
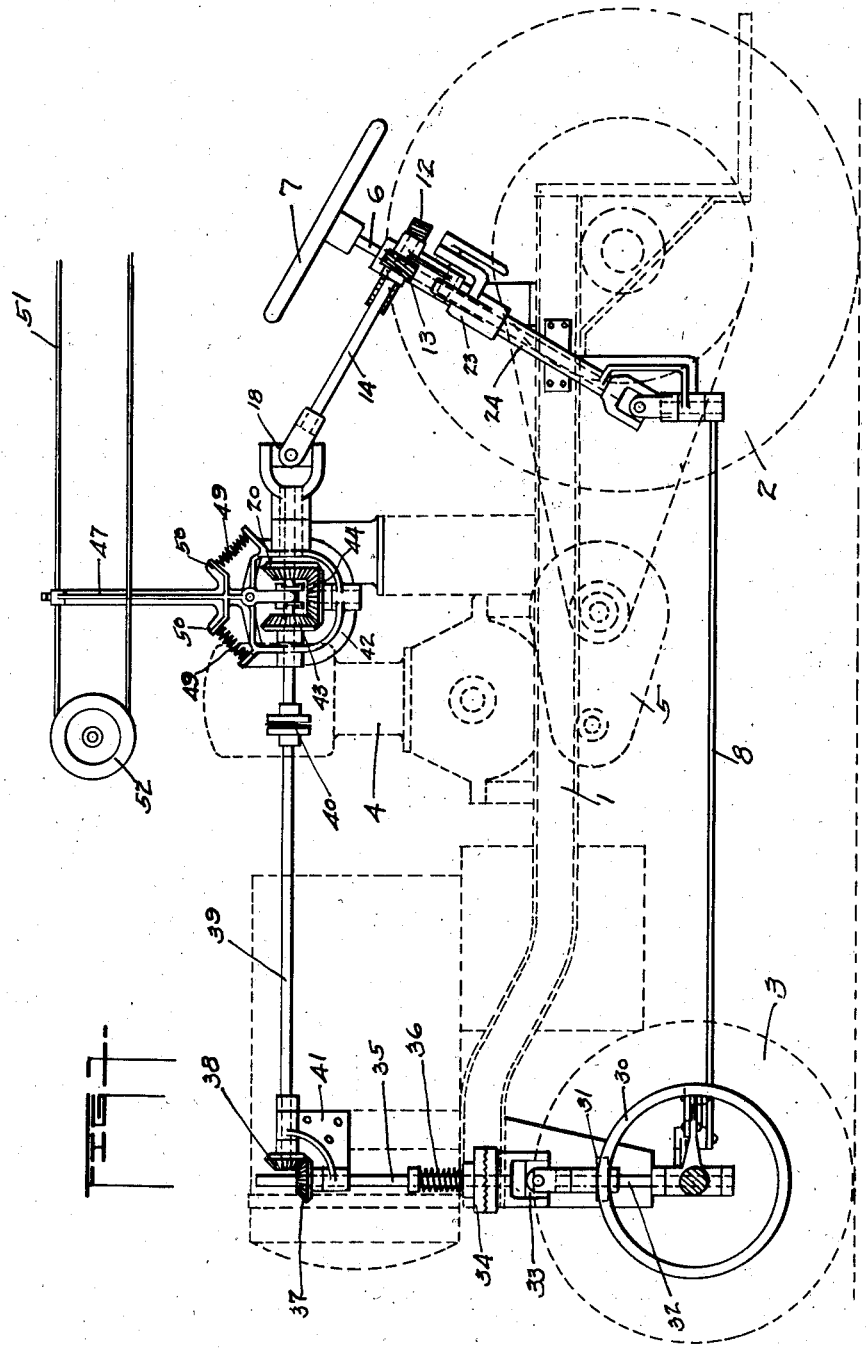

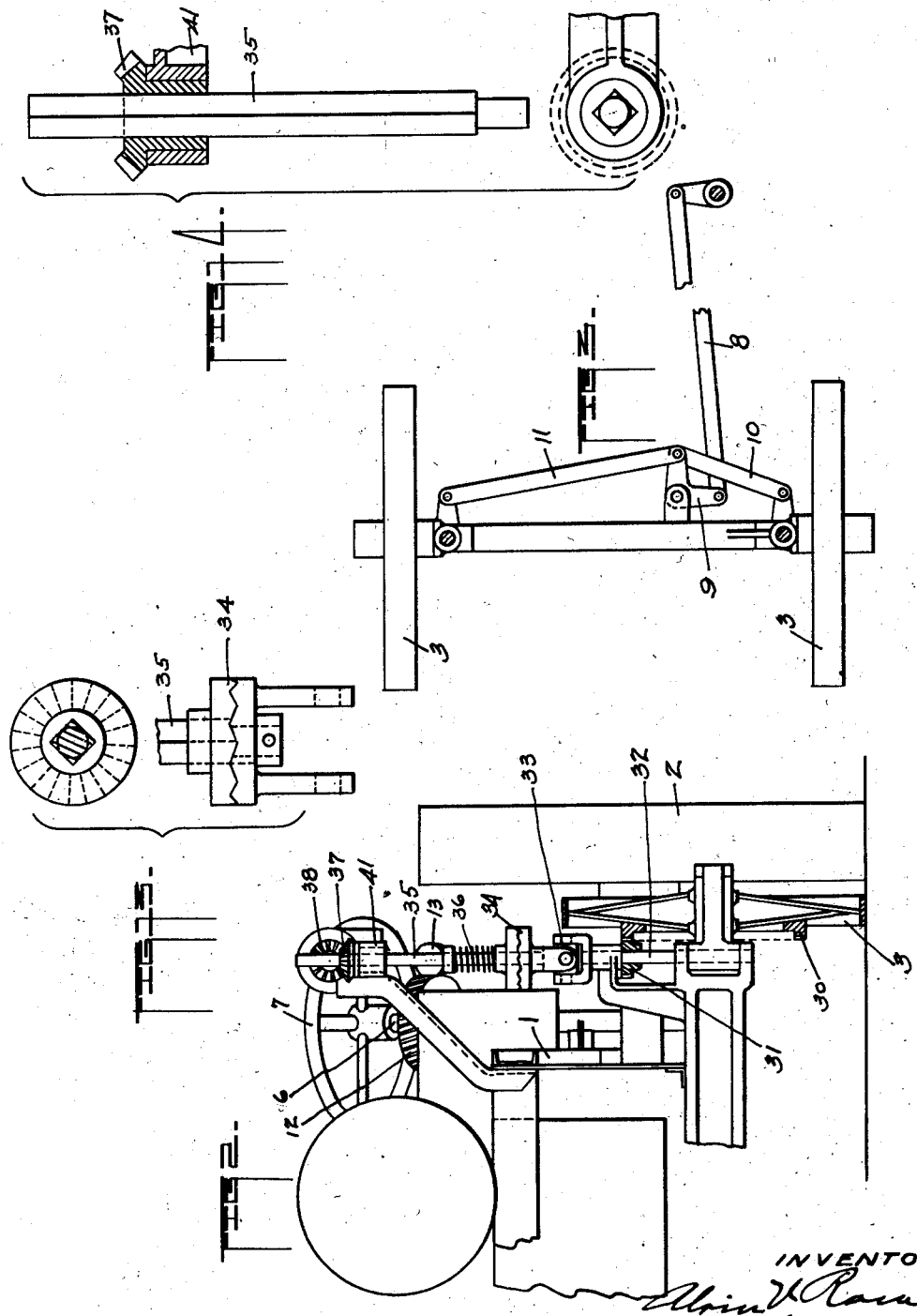

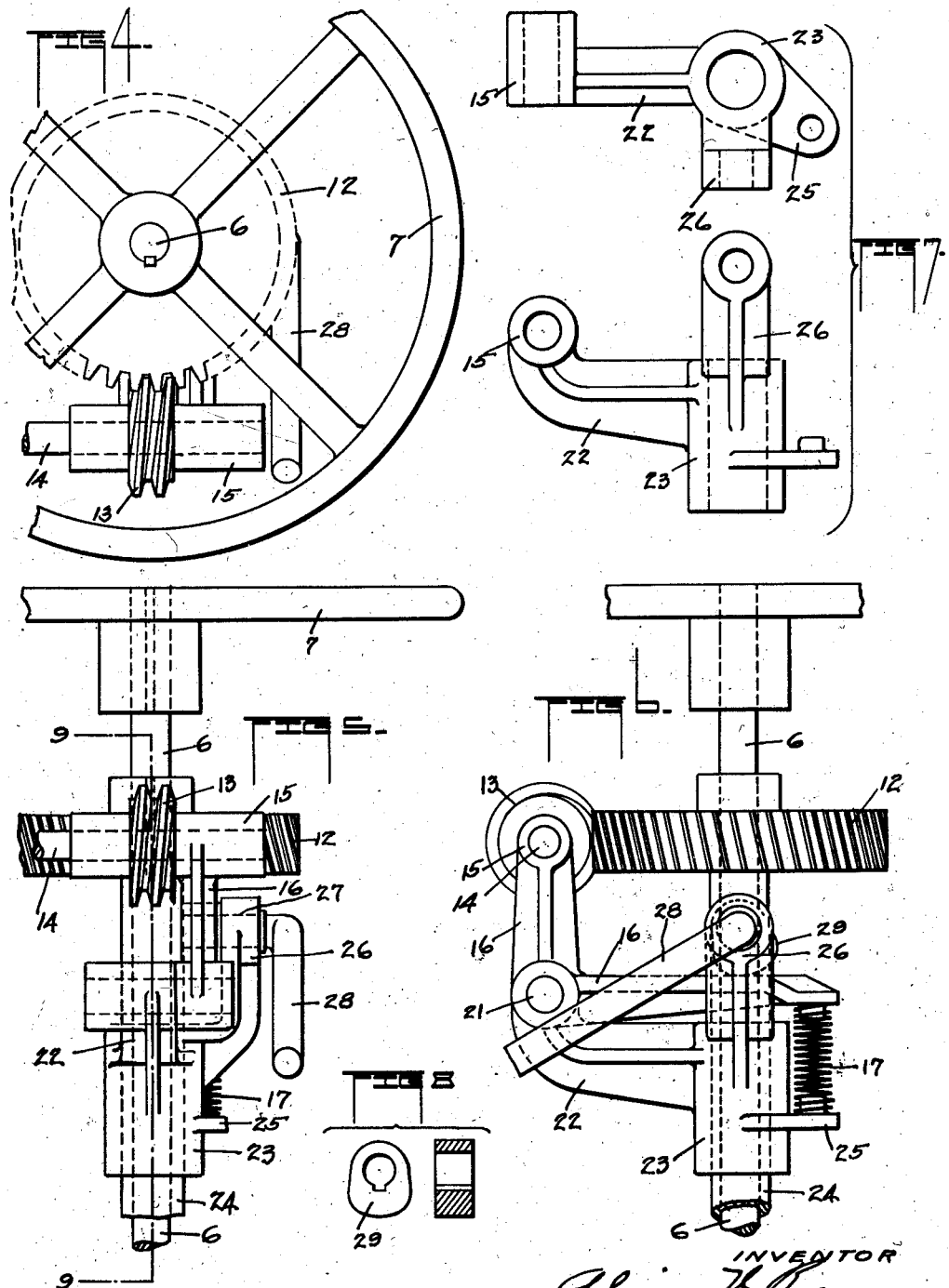

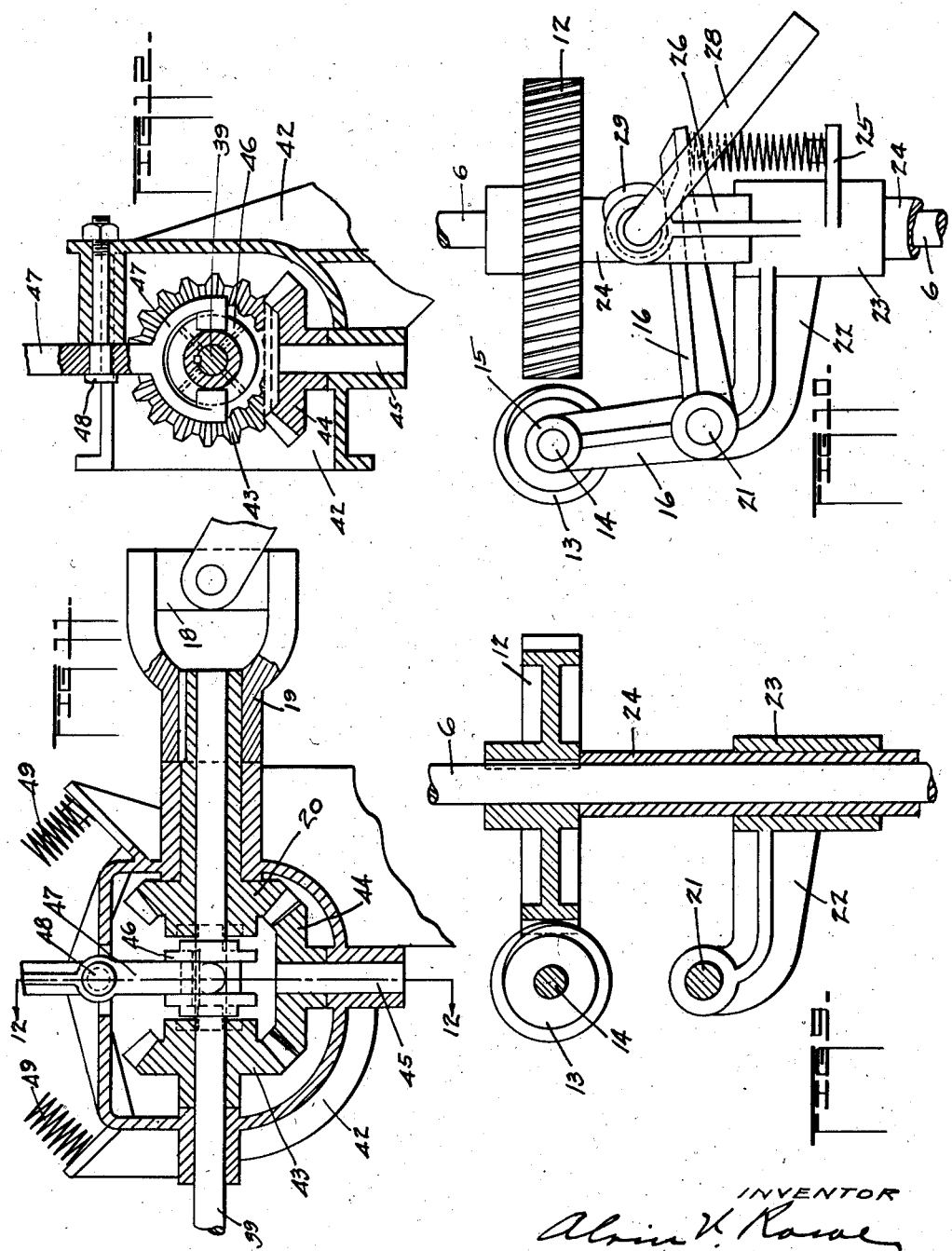

UNITED STATES PATENT OFFICE.

ALVIN V. ROWE, OF GALESBURG, ILLINOIS.

LINE CONTROL FOR STEERING MECHANISM OF TRACTORS.

1,355,851.  Specification of Letters Patent.  Patented Oct. 19, 1920.

Application filed June 23, 1919. Serial No. 306,200.

*To all whom it may concern:*

Be it known that I, ALVIN V. ROWE, a citizen of the United States, a resident of Galesburg, in the county of Knox and State of Illinois, have invented new and useful Improvements in Line Controls for Steering Mechanism of Tractors, of which the following is a specification.

This invention has reference to a "line" control for actuating the steering-post of tractors and like machines, whereby to direct the movement of the steering wheel or wheels.

The invention has for its principal object to operate the steering-post, preferably from and during the movement of the traction driven steering wheels, and providing a clutch control in the driving mechanism between the steering wheels and steering-post, and a "line" or "lines" for actuating said clutch.

The invention has for a further object to operate the steering-post from the traction driven steering wheels, which includes clutch controlled gearing, and a "line" or "lines" for actuating the clutch; and combining with such mechanism a means for disconnecting from the post, the means for operating the steering-post from the traction driven steering wheels, whereby the hand steering-wheels on the post and the "line" control may be alternately employed, as may be desired.

That the invention may be fully understood, reference is had to the following drawings, in which,—

Figure 1 is an outline, in elevation, of a tractor, showing my invention employed thereon for operating the steering-post from the steering wheels, including the "line" control, and the means for disconnecting the actuating means from the steering-post, whereby said post may be operated by the hand steering wheel on the post;

Fig. 2 is a partial front elevation, partly in section, showing the power transmitting means on one of the traction driven steering wheels;

Fig. 3 is a plan view showing the steering connections between the steering-post and steering wheels;

Fig. 4 is a plan view of the hand steering wheel on the steering-post and worm and worm-wheel gearing;

Fig. 5 is an elevation showing the steering-post, worm and worm-wheel gearing thereon, and means for releasing the worm from the worm-wheel, whereby the steering-post may be operated by the hand steering wheel;

Fig. 6 is an elevation of parts seen in Fig. 5, looking in at the right hand side of Fig. 5;

Fig. 7 shows opposite elevations of a bracket carried on the steering-post;

Fig. 8 shows in elevation and section a cam for locking the worm in operative relation with the worm-wheel;

Fig. 9 is a vertical section as the same would appear on the line 9—9, Fig. 5;

Fig. 10 is a view similar to Fig. 6, but with the worm out of operative engagement with the worm-wheel;

Fig. 11 is a sectional detail of the clutch mechanism in the operating means between the steering wheels and steering-post;

Fig. 12 is a sectional view as the same would appear on the line 12—12 Fig. 11;

Fig. 13 is an elevation in section of the power connection with the traction driven steering wheel, and Fig. 14 is a sectional detail of the slip-clutch shown in Fig. 13.

Like characters of reference denote corresponding parts throughout the figures.

We are not concerned with the specific tractor construction, and therefore, have only illustrated in outline so much as will show the application of the present invention, wherein 1 designates the frame, 2 the traction wheels; 3 the traction driven steering wheels; 4 the motor; 5 the driving connection to the traction wheel or wheels; 6 the steering-post having the usual hand steering wheel 7, and the steering connections between the post and traction driven steering wheels, including the reach 8 suitably connected at one end to the lower end of the steering post, and its opposite end coupled to a bell-crank 9, which in turn is coupled to the bars 10 and 11, in turn coupled, respectively, to the opposite traction-driven steering wheels 3.

Referring to the steering-post 6, it has keyed thereon, preferably just below the hand-wheel 7, the worm-wheel 12, and adapted to mesh therewith is a worm 13 on one end of a shaft 14, which at its inner end is journaled in a bearing member 15 preferably formed on one end of a bell-crank lever or arm 16, the opposite end of which is engaged by a compression spring 17. The other end of the shaft 14 is coupled by a substantially universal joint 18 with the end of an elongated hub or sleeve extension 19 of a bevel-gear wheel 20. The bell-crank lever or arm 16 is fulcrumed at 21 on an arm 22 of a bearing-bracket 23 keyed or otherwise secured on a sleeve or casing 24, inclosing the steering-post 9 and extending preferably, from the worm-wheel 12 to a point at, or near the lower end of the steering-post 6. Said bearing-bracket 23 has a plate extension 25 against which the opposite end of the compression spring 17 bears, as shown. Said bearing bracket 23 is further provided with an extension bearing 26 in which is journaled the spindle 27 on the end of a crank-arm 28, and on the end of said spindle 27 is secured the cam 29 which may be caused to have a frictional bearing relation with an arm of the bell-crank lever 16, see Fig. 6, to hold it in a position which will bring the worm 13 into meshing relation with the worm-wheel 12 and operate said worm-wheel when motion is imparted to said worm. Moving the crank-arm 28 into the position shown, in Fig. 10, will move the cam 29, so that the spring 17 will act to raise one end of the bell-crank lever 16, throwing the other end outwardly and release the worm 13 from engagement with the worm-wheel 12.

When the parts just described are in the position shown in Figs. 1, 5 and 6, the steering-post is operated from the traction driven steering wheels, and when said parts are in the position shown in Fig. 10, the steering-post is operated from the hand steering wheel 7, by hand.

Attached, preferably to the spokes of one of the traction-driven steering wheels 3, is a gear wheel 30, and meshing with said wheel is a small pinion 31 on the lower end of a shaft 32 which is coupled by a substantially universal coupling 33 with the lower member of a slip-clutch 34, which is preferably loosely carried on the lower rounded end of a shaft 35. Said shaft from the lower member of said slip-clutch is preferably square, and carried thereby and adapted to have slidable movement thereon, is the upper half of said slip-clutch, which is yieldingly held in engagement with its complementary member by the coil spring 36. On the upper end of the shaft 35 is carried a bevel gear wheel 37 in mesh with and adapted to operate a bevel gear wheel 38 on the outer end of a sectional shaft 39 coupled by the flexible coupling 40. It is apparent that when the tractor is in motion and ground conditions are normal, continuous motion is imparted from the traction driven steering wheels to the shaft 39. My purpose in using the slip-clutch 34, the square shaft 35 and the flexible coupling 40 in the shaft 39 is to provide a structure which will operate under all conditions without breaking or straining the operating or driving parts. For instance, the members of the slip-clutch, held in working relation by the spring 36, will yield and slip on each other under varying strains, and ground conditions, and the clutch together with the shaft may float up and down when irregularities in ground conditions are encountered, without in any way interfering with the operation of the mechanism. The upper end of shaft 35 and the outer end of the shaft 39 are journaled in a suitable support 41. The inner end of the shaft 39 is journaled in a bearing support 42 and has loosely carried thereon the bevel gear wheel 20.

Also loosely carried on said shaft 39, spaced from and facing the wheel 20, is a similar bevel gear wheel 43, and said bevel gear wheels 20 and 43 mesh with a companion bevel gear wheel 44 on a short shaft 45 journaled in the support 42. The matching faces of the bevel gear wheels 20 and 43 have clutch faces, as shown, which are adapted to be engaged by a clutch member 46 which has a spline and groove connection with the shaft 39. A lever 47 operatively connected with the clutch 46 and fulcrumed at 48 to the support 42 is employed to shift the clutch 46 into and out of engagement with either of the bevel gear wheels 20 and 43, as will be understood, and springs 49 hold the lever in the neutral position, shown in Figs. 1 and 11. These springs preferably bear between arm extensions 50 on the lever and extensions from the support 42.

51 is a "line" control which preferably crosses the extreme upper end of the lever 47, and has connection therewith, and passing over a guiding pulley or wheel 52, supported in any suitable manner, returns and preferably recrosses the lever 47 without connection therewith. The ends of the "line" may reach any suitable point in the rear of the tractor to be handled by an operator who may be on any implement or vehicle attached to and drawn by the tractor. In this manner the operator pulling on the upper stretch of the "line" 51, can throw the clutch 46 into engagement with the bevel gear wheel 43 and cause motion to be transmitted through the bevel gear wheels 44 and 20 to the shaft 14 and actuate the worm 13 and worm wheel 12 to operate the steering-post 6 and through it operate the steering connections to turn the traction driven steering wheels 3 in one direction. Pulling on the lower stretch of the "line" 51, will reverse the movement of the lever 47, causing the bevel gear wheel 20 to become connected with the shaft 39 and the motion then imparted to the steering-post 6 will be the reverse of that described, and cause the traction driven steering wheels 3 to be turned in an opposite direction to that just previously described. The clutch construction, at 46, must be of such a character that the gear wheels 20 and 43 may be connected with the shaft 39, whether the tractor is moving forward or backward, all of which it is believed is understood.

It is believed the parts and mechanisms have been sufficiently described in respect to their relation with each other that the operation of the machine will be understood without further elaboration. I wish it understood, however, that while I have chosen to illustrate the invention by certain specific details of structure, I do not wish to be confined to such arrangement of parts and construction, as I am quite fully aware that the results aimed at may be obtained by other and various means without departing from the spirit and scope of the invention.

What I claim is:—

1. In a tractor, in combination, traction driven steering wheels, a steering-post provided with the usual steering wheel, steering connections between said steering wheels and post, operating connections between said wheels and post independent from said steering connections, clutch controlled gearing in said operating connections, and a "line" control for said clutch.

2. In a tractor, in combination, traction driven steering wheels, a steering-post provided with the usual steering wheel, steering connections between said steering wheels and post, and means to actuate the post from said wheels, said last named means being independent from said steering connections.

3. In a tractor, in combination, traction driven steering wheels, a steering-post provided with the usual steering wheel, steering connections between said steering wheels and post, means independent from said steering connections to actuate the post from said steering wheels, said actuating means normally ineffective, and means to effect connection of the actuating means with said post.

4. In a tractor, in combination, traction driven steering wheels, a steering-post provided with the usual steering wheel, steering connections between said steering wheels and post, gearing for operating the said post from said steering wheels, said gearing including a clutch for connecting and disconnecting the wheels with the post, and means to actuate said clutch.

5. In a tractor, in combination, traction driven steering wheels, a steering-post provided with the usual steering wheel, steering connections between said steering wheels and post, gearing for operating the said post from said steering wheels, said gearing including a clutch for connecting and disconnecting the wheels with the post, a lever for throwing said clutch, and a "line" control for actuating said lever.

6. In a tractor, in combination, traction driven steering wheels, a steering-post provided with the usual steering wheel, steering connections between said steering wheels and post, means to actuate the post from said steering wheels, said actuating means normally ineffective, means to effect connection of the actuating means with said post, and a "line" control for said connecting means.

7. In a tractor, in combination, traction driven steering wheels, a steering-post provided with the usual steering wheel, steering connections between said steering wheels and post, operating connections between said wheels and post independent from said steering connections, certain of said operating connections arranged to operate continuously with the movement of said steering wheels, clutch controlled gearing in said operating connections, and a "line" control for actuating said clutch.

8. In a tractor, in combination, traction driven steering wheels, a steering-post having a steering wheel, steering connections between the traction driven wheels and said post, operating connections between said traction driven wheels and said post, clutch controlled gearing in said operating connections, a "line" control for said clutch, and means to disconnect said operating connections at the post, whereby the post may be actuated by the hand steering wheel.

9. In a tractor, in combination, traction driven steering wheels, a steering post having a hand steering wheel, steering connections between said traction driven wheels and said post, a worm-wheel on said post, a worm supported to be moved into and out of operative connection with said worm-wheel, operating connections between said traction driven steering wheels and said worm, clutch controlled gearing in said operating connections, a lever for actuating said clutch, and a "line" control for actuating said lever.

10. In a tractor having manual steering means, means to operate said steering means by the tractor movements, and means to engage and disengage the steering means at will from the operating means so as to provide a selective manual or power drive for the steering means.

In witness whereof, I have hereunto affixed my hand this 14th day of June, 1919.

ALVIN V. ROWE.